US007211729B1

(12) United States Patent
Yang

(10) Patent No.: US 7,211,729 B1
(45) Date of Patent: May 1, 2007

(54) JACK STRUCTURE

(75) Inventor: Lien-Huang Yang, Chung-Ho (TW)

(73) Assignee: Jazz Hipster Corporation, Chung-Ho, Taipei Hsien (TW)

( * ) Notice: Subject to any disclaimer, the term of this patent is extended or adjusted under 35 U.S.C. 154(b) by 0 days.

(21) Appl. No.: 11/308,214

(22) Filed: Mar. 13, 2006

(51) Int. Cl.
*H02G 3/14* (2006.01)

(52) U.S. Cl. .......................... 174/66; 174/67; 439/135; 200/51.09

(58) Field of Classification Search .................. 174/66, 174/67, 53; 439/135–145; 200/51.09, 51 R, 200/51.03, 241, 242
See application file for complete search history.

(56) References Cited

U.S. PATENT DOCUMENTS

| | | | | |
|---|---|---|---|---|
| 5,087,796 | A * | 2/1992 | Norman | 174/67 |
| 5,240,426 | A * | 8/1993 | Barla | 439/136 |
| 5,389,740 | A * | 2/1995 | Austin | 174/67 |
| 5,934,919 | A * | 8/1999 | Cross et al. | 439/136 |
| 6,146,160 | A * | 11/2000 | Chang | 439/137 |
| 6,229,107 | B1 * | 5/2001 | Flint et al. | 200/51.09 |
| 6,932,631 | B2 * | 8/2005 | Huang | 439/145 |
| 7,045,723 | B1 * | 5/2006 | Projkovski | 200/51.09 |
| 7,070,426 | B2 * | 7/2006 | DeCell et al. | 439/135 |
| 7,094,969 | B1 * | 8/2006 | In | 174/66 |

* cited by examiner

*Primary Examiner*—Dhiru R. Patel
(74) *Attorney, Agent, or Firm*—Pai Patent & Trademark Law Firm; Chao-Chang David Pai

(57) ABSTRACT

Disclosed is an improved jack structure, includes a main body, a cover, two protective covers, a lock piece and a conductive piece. When an object is inserted into a single one of insertion holes each corresponding to one of the protective covers on the main body, a corresponding one of the protective covers is pushed to move. A protrusion of the pushed protective cover then pushes an urging portion of the lock piece and the urging portion is stopped by the other one of the protective covers. Therefore, the improved jack structure can be prevented from being inserted with an acute object and thus from occurrence of electric shock.

4 Claims, 6 Drawing Sheets

JACK STRUCTURE

BACKGROUND OF THE INVENTION

1. Field of the Invention

The present invention relates to an improved jack structure, and more particularly to an improved jack structure in which a lock piece and protective covers are disposed for sealing jack holes when an acute metal material is inserted, thus preventing electric shock from occurring accidentally.

2. Description of the Prior Art

In household environment, there are many electrical sockets or jacks for connecting the appliances to power. For a home with a child, the jacks are likely exposed to danger since the child may curiously insert some conductive material into the jack holes. This is a great concern to the parents. When this occurs, electric shock would be caused.

To solve this problem, a plastic jack cover has been in common use. On the plastic jack cover, two columns are provided which can be inserted into the jack holes. As such, the jack holes cannot be inserted with anything else. However, the child might possibly detach the jack cover, stultifying the safety design of the plastic jack cover and still causing the safety issue to be concerned.

In view of the above discussion, the conventional jack structure still has some shortcomings to be addressed and thus has to be improved. Accordingly, the inventors have made an effort in the related field and finally developed successfully an improved jack structure of the present invention.

SUMMARY OF THE INVENTION

It is, therefore, an object of the present invention to provide an improved jack structure in which a lock piece and protective covers are disposed against each other so that the jack holes thereof can be prevented from being inserted with an acute object and thus from occurrence of electric shock.

It is another object of the present invention to provide an improved jack structure which is simple in structure, guaranteed with safety and low in cost.

The improved jack structure according to the present invention comprises a main body having a fillister formed at a center portion thereof, two jack holes formed at an upper portion thereof and two insertion holes formed at a lower portion thereof, the fillister having two connection axis holes formed therein and an insertion slot formed at a lower portion thereof, the two jack holes, the two insertion holes and the fillister being open to one another; a cover plate having two connection holes formed at an upper portion thereof and disposed within the fillister of the main body in such a manner that the connection holes are aligned to the connection axis holes; two protective covers each having a rotation axis disposed at a corresponding one of two sides thereof, each having a protruding post at one of the two sides, each having an urging portion at a front side thereof, each having a protrusion at a lower portion thereof, each connected pivotally at a first position to a second position where the connection axis holes of the main body and the connection holes of the cover plate through the respective rotation axis and having a spring disposed at the first position, the spring having an end sleeving on the respective protruding post of the protective post; a lock piece having two urging bumps extending horizontally thereon and inserting the insertion slot of the main body at a lower end; and two conductive pieces each having a mating bump disposed thereon through which each conductive piece is fixed within the main body when inserted into the main body.

These features and advantages of the present invention will be fully understood and appreciated from the following detailed description of the invention with reference to the accompanying drawings.

DETAILED DESCRIPTION OF THE PREFERRED EMBODIMENT

Figure 1:
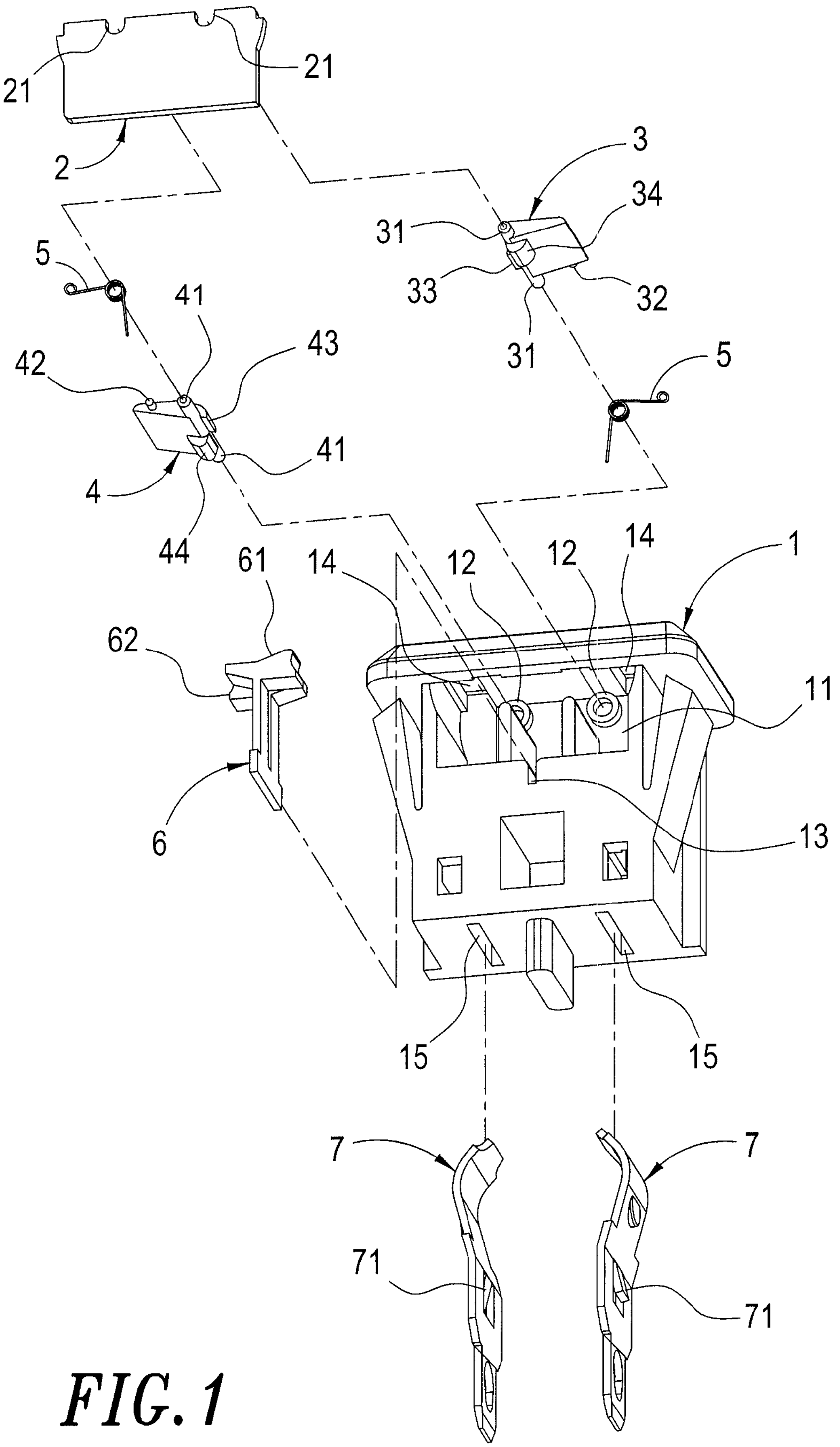
FIG. 1 is an exploded diagram of an improved jack structure according to the present invention.
Figure 2:
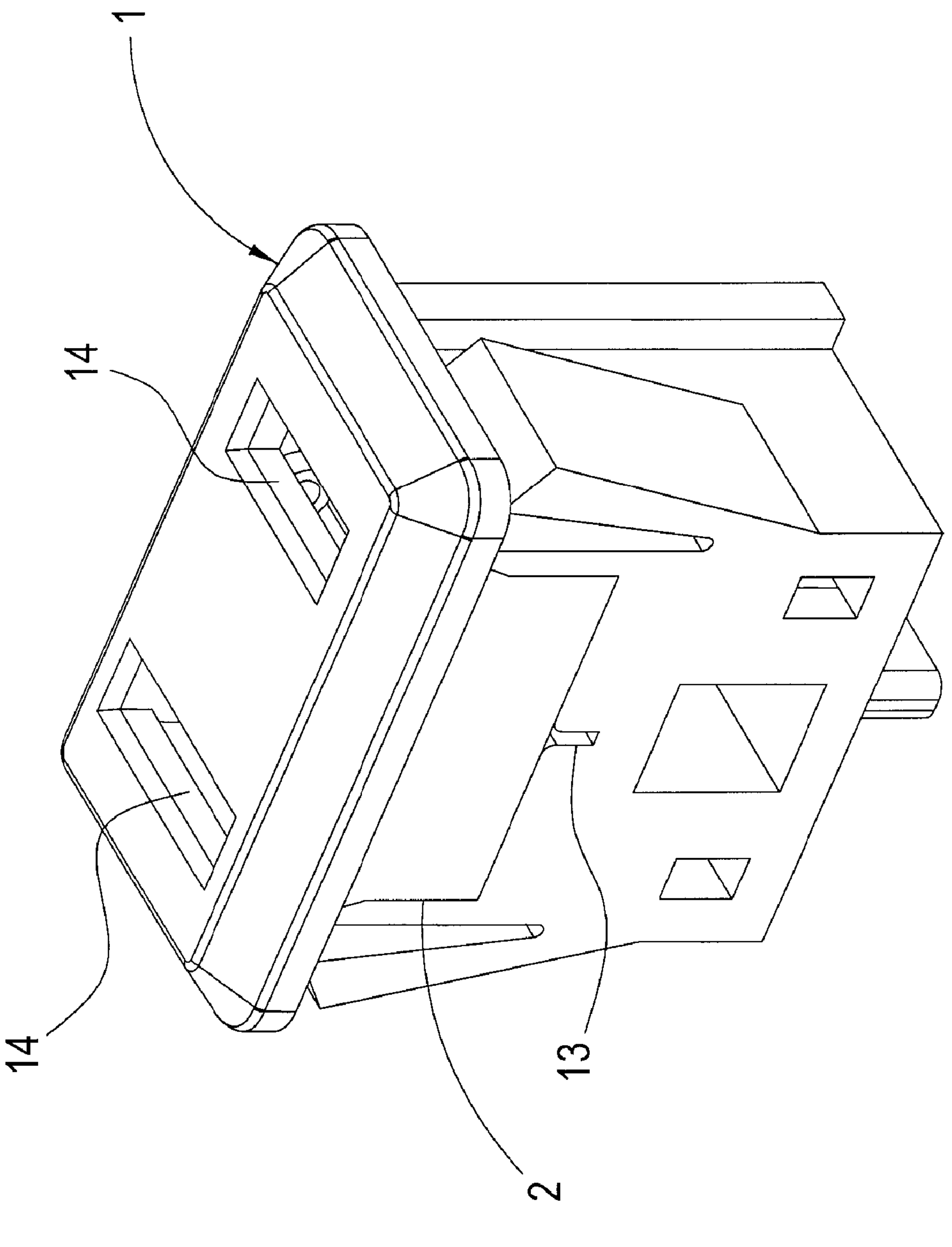
FIG. 2 is a perspective diagram of the improved jack structure according to the present invention.
Figure 3:
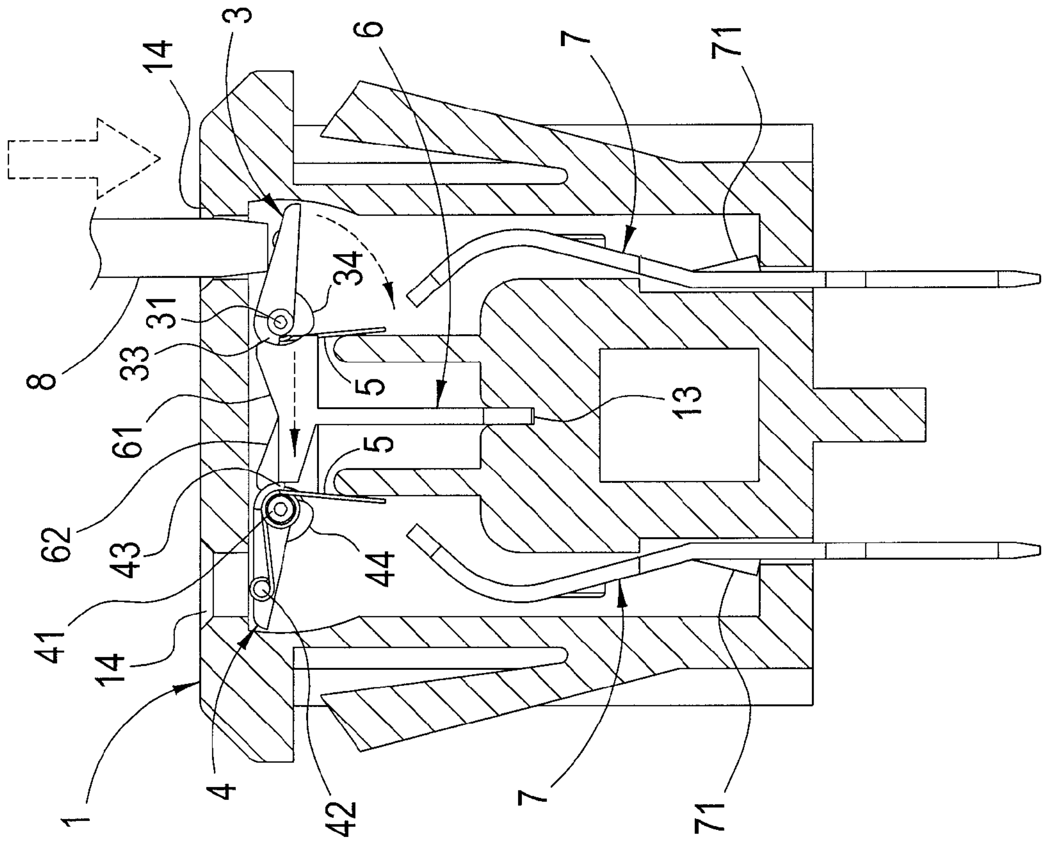
FIG. 3 is a schematic diagram showing the improved jack structure according to the present invention with a jack hole thereof being inserted with an object.

Referring to FIG. 1 through FIGS. 4A–4C, an improved jack structure according to the present invention is shown therein.

The jack structure comprises a main body 1, a cover plate 2, two protective covers 3, 4, a lock piece 6 and conductive pieces 7. The main body 1 has a fillister 11 disposed at a center region. Within the fillister 11, two connection axis holes 12 and an insertion slot 13 are disposed. On the main body 1, two jack holes 14 are provided at an upper portion thereof and two insertion holes 15 are provided at a lower portion thereof. The jack holes 14, insertion holes 15 and fillister 111 are open to one another.

The cover plate 2 has two connection holes 21 disposed at an upper region thereof and is received within the fillister 11 of the main body 1 in such a manner that the connection holes 21 and the connection axis holes 12 are aligned to each other.

At one of two sides of the protective cover 3, there is a respective rotation axis 31. At one of two sides of the protective cover 4, there is a respective rotation axis 41. At a front end of each of the protective covers 3 and 4, there is a respective urging portion 33,43 protruding therefrom. At a lower end of each of the protective covers 3 and 4, there is a respective protrusion 34, 44. The two protective covers 3, 4 are pivotally connected to the connection axis holes 12 of the main body 1 and the connection holes 21 of the cover plate 2. At a side of each of the protective cover 3, 4, a respective spring 5 is provided to sleeve on a respective post 32, 42 of each of the protective covers 3,4 so that the protective covers 3,4 each receive a restoring force provided by the respective spring 5.

The lock piece 6 has two urging bumps 61, 62 extend horizontally on an upper region thereof and a lower region thereof is inserted into an insertion slot 13 of the main body 1.

On each of the conductive pieces 7, a respective mating bump 71 is formed. Each of the conductive pieces 7 is inserted into a corresponding one of the insertion holes 15 of the main body 1 and fixed on the main body 1 by means of the mating bump 71.

When one of the jack holes 14 is inserted with an acute object 8 and the corresponding protective cover 3 is pushed to move (referring to FIG. 3), the protrusion 34 of the protective cover 3 pushes the urging bump 61 of the lock piece 6. At this time, the urging bump 61 is urged by the urging portion 43 of the other protective cover 4 and thus the acute object 8 can not be inserted into the single protective cover 3. As such, electric shock caused from the acute object 8 may be prevented.

Figure 4A:
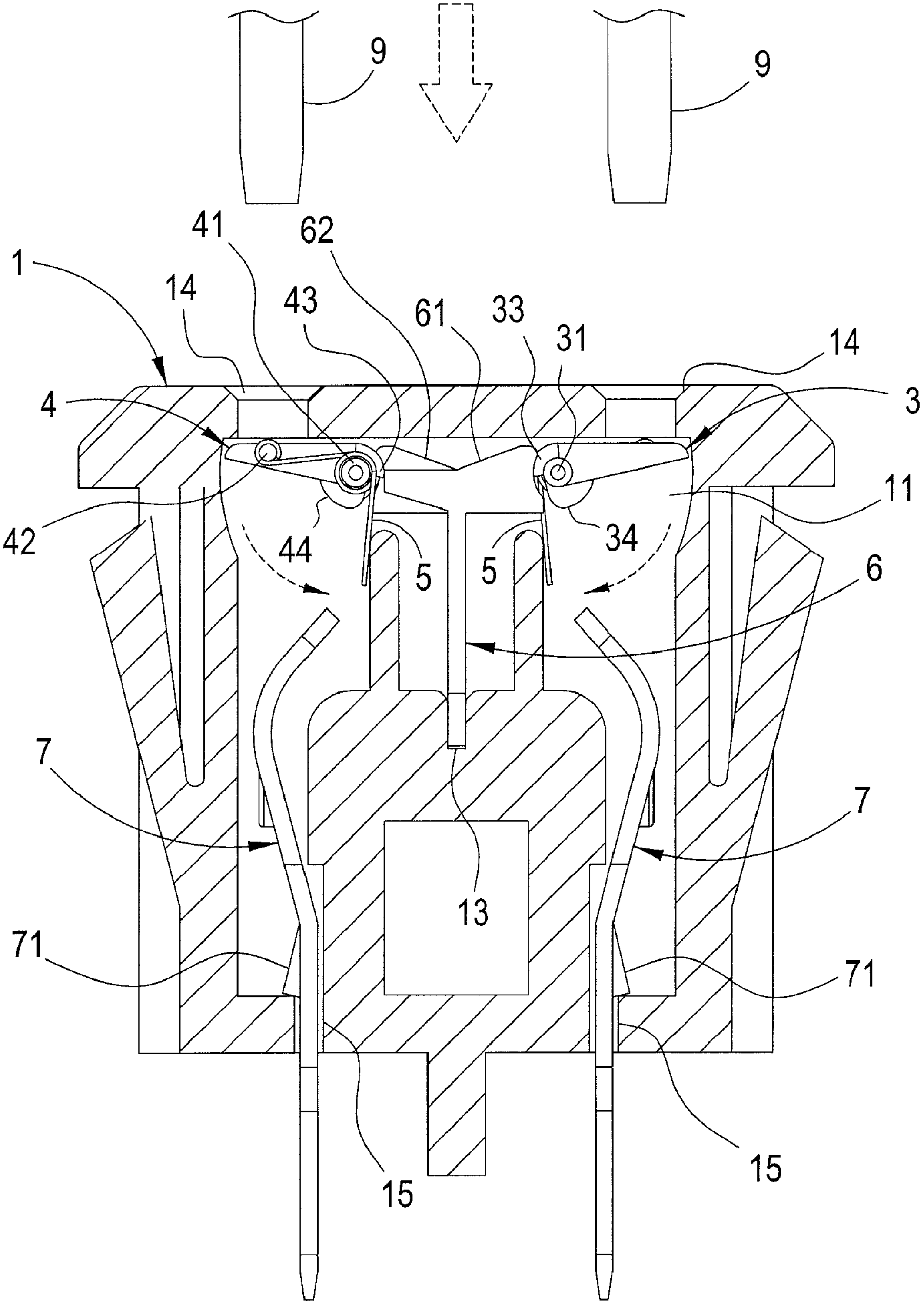
FIGS. 4A through 4C are schematic diagrams showing the improved jack structure according to the present invention with two jack holes thereof being inserted with two conductive prongs of a plug, respectively.
Figure 4B:
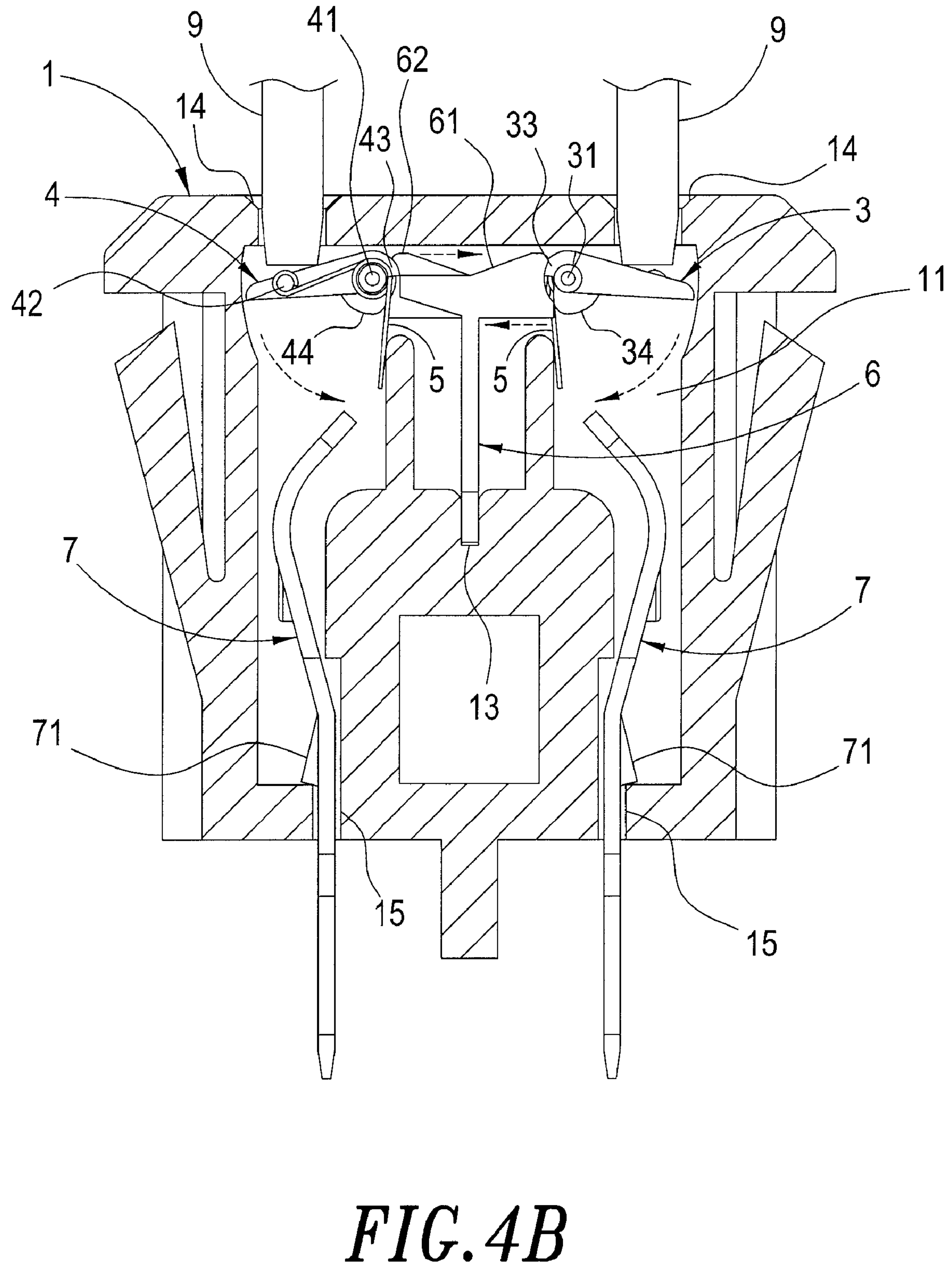
Figure 4C:
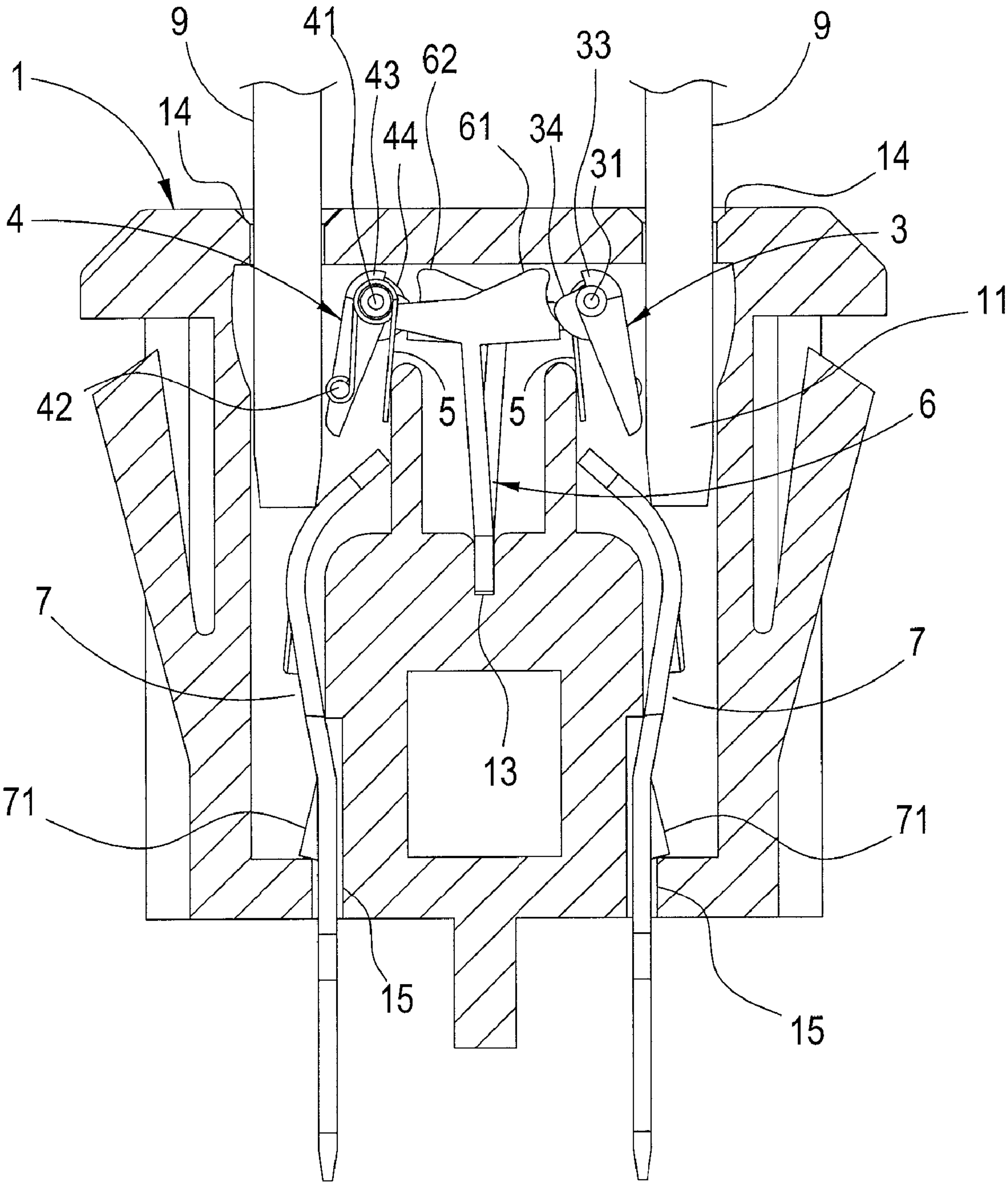

Referring to FIGS. 4A through 4C, schematic diagrams showing the improved jack structure with the two jack holes being inserted with an object, respectively, according to the present invention are shown therein. When two conductive prongs 9 of a plug are inserted into a corresponding one of the two jack holes 14 respectively, the two protective covers 3, 4 are pushed downwards together. At this time, the two urging portions 33,43 jointly urge the two urging bumps 61,62 of the lock piece 6 and thus leave away from the urging positions (referring to FIGS. 4A and 4B). Meanwhile, each of the protrusions 34,44 of the protective covers 3, 4 pushes a corresponding one of the two urging bumps 61, 62 to move concurrently horizontally as illustrated in the drawing. As such, the protective covers 3, 4 do not urge each other and thus the conductive prongs 9 may be inserted smoothly into the jack holes (shown in FIG. 4C). Therefore, the improved jack structure may prevent electric shock caused by the insertion of an acute object.

As compared to the prior art, the improved jack structure has the following merits: 1. the lock piece and the protective cover in the improved jack structure urge each other and thus close the jack holes when an acute object is inserted into the jack hole. 2. The improved jack structure is simple in structure, guaranteed with safety and low in cost.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An improved jack structure, comprising:

a main body having a fillister formed at a center portion thereof, two jack holes formed at an upper portion thereof and two insertion holes formed at a lower portion thereof, the fillister having two connection axis holes formed therein and an insertion slot formed at a lower portion thereof, the two jack holes, the two insertion holes and the fillister being open to one another;

a cover plate having two connection holes formed at an upper portion thereof and disposed within the fillister of the main body in such a manner that the connection holes are aligned to the connection axis holes;

two protective covers each having a rotation axis disposed at a corresponding one of two sides thereof, a protruding post at one of the two sides, an urging portion at a front side thereof, and a protrusion at a lower portion thereof, wherein each protective cover is connected pivotally through the respective rotation axis at a first position to one of the connection axis holes of the main body and at a second position to one of the connection holes of the cover plate, and wherein a spring is respectively disposed at the first position, the spring having an end sleeving on the respective protruding post of the protective post;

a lock piece having two urging bumps extending horizontally thereon and inserting the insertion slot of the main body at a lower end; and two conductive pieces each having a mating bump disposed thereon through which each conductive piece is fixed within the main body when inserted into the main body.

2. The improved jack structure according to claim 1, wherein each of the urging portions of the protective covers urges a respective one of the two urging bumps of the lock piece.

3. The improved jack structure according to claim 1, wherein the respective protrusion of one of the protective covers pushes a corresponding one of the urging bumps of the lock piece when a corresponding one of the protective covers is pushed so that the urging bump is urged by the other protective cover, preventing the improved jack structure from being inserted with an object.

4. The improved jack structure according to claim 1, wherein the urging portions of the protective covers are free from urging each other when urging the lock piece and then the respective protrusion of a corresponding one of the two protective covers pushes concurrently a corresponding one of the two urging bumps, preventing the two protective covers from urging each other and allowing the conductive prongs of a plug to be inserted into the improve jack structure.

* * * * *